March 15, 1966 P. LAURÈS 3,241,091

WAVE GUIDING STRUCTURE

Filed Dec. 15, 1961

INVENTOR: P. LAURES

BY Paul M. Craig, Jr.
ATTORNEY

United States Patent Office 3,241,091
Patented Mar. 15, 1966

3,241,091

WAVE GUIDING STRUCTURE

Pierre Laurès, Paris, France, assignor to CSF-Compagnie Generale de Telegraphie Sans Fil, Paris, France Filed Dec. 15, 1961, Ser. No. 159,640
Claims priority, application France, Dec. 30, 1960, 848,429
11 Claims. (Cl. 333—31)

The present invention relates to a wave guiding structure, and more particularly, relates to ladder-type delay lines for use especially within micro-wave travelling wave tubes.

The present invention has as its primary object a delay line of the aforementioned type which has the characteristic of backward propagation in the symmetric mode and which is realized in a very simple manner.

It is known in the prior art that a ladder-type line which is not provided with special means such as a conductive surface usually called back-plate disposed in proximity to the plane thereof, does not present practically any band-pass or does not even propagate practically at all the microwave energy. It is also known that for such a delay line to propagate effectively the high frequency, it is appropriate to reduce one of the electric and magnetic couplings between successive cells of the line relative to the other coupling of the same cells. Such teachings may be found, for example, in the French Patent 1,068,673 of June 28, 1952, filed in the name of the assignee of the present application.

Insofar as the delay lines are concerned in which the backward propagation takes place for the fundamental space harmonic, the magnetic coupling is reduced with respect to the electric coupling by means of baffles or the like, interposed between the extremities of adjacent bars of the ladder. Insofar as delay lines are concerned in which the inverse or backward propagation takes place for the first space harmonic, the electric coupling is reduced with respect to the magnetic coupling by the disposition of a ridged back-plate. In all of these cases, the realization of the structure necessitates either lateral supports or back plates provided with slots or ridges which are usually machined by milling or by some other relatively costly process.

The present invention proposes a structure which is much more simple in its realization from the mechanical point of view, and which assures, at least for the symmetric mode, the characteristic of backward propagation both for the fundamental component as well as for the first space harmonic.

Accordingly, it is an object of the present invention to provide a delay line structure of the type mentioned hereinabove which effectively eliminates the shortcomings and inconveniences encountered with the prior art structures in a simple manner.

Another object of the present invention resides in the provision of a ladder-type delay line which offers a characteristic of backward propagation, at least for the symmetric mode, for both the fundamental component and the first space harmonic.

Still a further object of the present invention resides in the provision of a ladder-type delay line adapted for use in the microwave or hyperfrequency range which not only effectively eliminates the shortcomings and inadequacies of the prior art structures mentioned hereinabove, but also may be readily manufactured with great accuracy and without involving large expenditures connected with such manufacture These and other objects, features and advantages of the present invention will become more obvious from the following description when taken in connection with the accompanying drawing which shows, for purposes of illustration only, one embodiment in accordance with the present invention, and wherein FIGURE 1 is a transverse cross sectional view of a delay line structure according to the present invention, taken along line 1—1 of FIGURE 2;

According to the present invention, the delay line is constituted by an anti-symmetric, geometrically periodic structure which is composed of identical bars bent at the two ends thereof and alternately displaced in the one or the other direction with respect to the longitudinal plane of anti-symmetry, the extremities of the bars being secured to a smooth back-plate.

The bars in accordance with the present invention are advantageously realized as hollow tubes which may be cooled by the circulation of liquid.

Figures 1, 2, 3, 4:
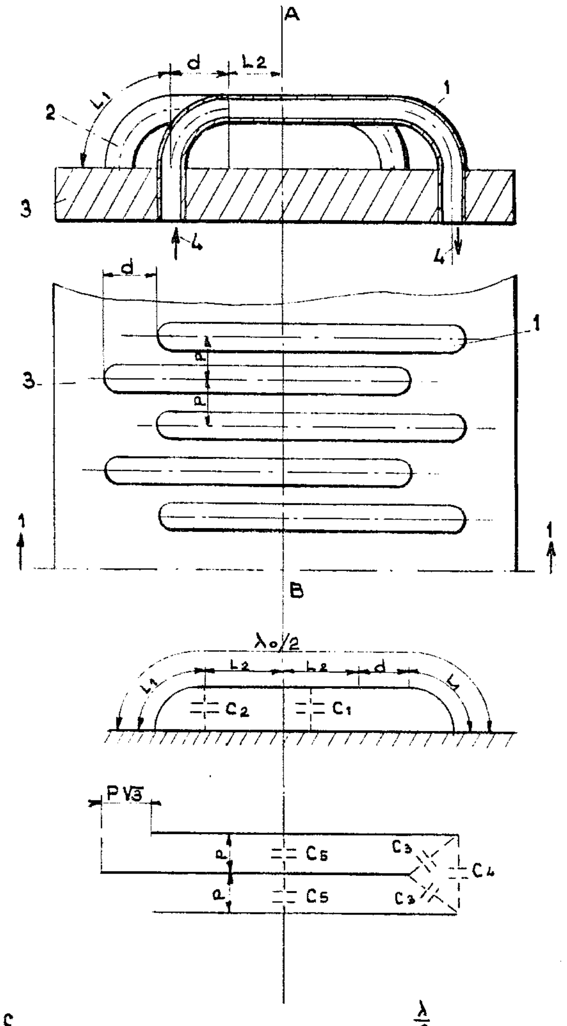
FIGURE 2 is a partial plan view of the delay line illustrated in FIGURE 1.
FIGURES 3 and 4 are schematic views corresponding to FIGURES 1 and 2, respectively, shown herein to provide an explanation of the electric characteristics of the line.

Referring now to the drawing wherein like reference numerals are used throughout the various views to designate corresponding parts, and more particularly to FIGURES 1 and 2, these two figures show a delay line which is constituted by a series of equidistant metallic bars 1 that have the two ends thereof bent as indicated at 2. These bent extremities or ends are secured in any suitable manner to a back plate 3 constituted by a simple smooth metallic plate. The bars 1 are preferably but not necessarily made of hollow tubing through which is established a circulation of cooling liquid schematically indicated by the arrows 4. The successive bars 1 are alternately displaced transversely by a distance $d$ in such a manner that the structure is anti-symmetric with respect to the longitudinal plane A B.

The distance between the axes of the bars, that is the pitch between successive bars, equal to half the pitch of the periodic structure of which one complete cell is formed by a pair of successive bars, is designated in the drawing by $p$. The length of the bent portion of the bars 1 is designated by $L_1$, and the length of the straight portion on the "short" side of the plane of antisymmetry AB is designated by $L_2$. The length of the "short" portion of the bar is therefore equal to $L_1+L_2$, and the length of the "long" portion on the opposite side of the plane of anti-symmetry AB is therefore equal to $L_1+L_2+d$. The total length of the bar is equal to the central half-wave-length of the band $\lambda_0$, that is:

$$2L_1+2L_2+d=\frac{\lambda_0}{2}$$

It may be readily seen from this description that in order to propagate a wave with a characteristic of backward propagation, the line according to the present invention makes use of means for reducing the coupling between homologous ends of adjacent bars, analogous to that used in FIGURE 11 of the aforementioned French patent. However, these means are utilized in the present invention in combination with the creation of a supplementary coupling between homologous extremities of the nonadjacent bars, a coupling symbolically indicated by the capacity $C_4$ in FIGURE 4. The totality of these two means is realized by the alternate lateral displacement of the bars 1. There corresponds to this physical difference a difference of structure, expressed by the anti-symmetry of the line whereas all of the delay lines of the aforementioned French patent were symmetrical. As a result thereof, whereas only the symmetrical mode could propagate in the delay lines of the aforementioned French patent, the line according to the present invention permits propagation, in addition to the symmetric mode, also of an anti-symmetric mode. However, as within this mode the field is most intense at the ends of the bars and zero or very low within the central portion along which propagates the beam of the tube, the intervention of this mode in the mechanism of interaction is therefore negligible. Consequently, the following study of the propagation will be limited to the propagation of the symmetric mode within the line according to the present invention.

According to a theory advanced by applicant, the displacement $\psi$ per cell of line according to the present invention is related to the wave length $\lambda$ by the transcendental equation as follows:

$$\tan \frac{2\pi\left[L_1+\frac{d}{4}\right]}{\lambda} \tan \frac{2\pi\left[L_2+\frac{d}{4}\right]}{\lambda} = \frac{C_2+4C_3 \sin^2 \frac{\psi}{2}+4C_4 \sin^2 \psi}{C_1+4C_5 \sin^2 \frac{\psi}{2}}$$

in which:

$C_1$ is the capacity per unit length of the central portion of a bar with respect to the back-plate (FIGURE 3);

$C_2$ is the capacity per unit length of the lateral portion of a bar with respect to the back-plate (FIGURE 3);

$C_3$ is the capacity per unit length between the homologous lateral portions of two adjacent bars (FIGURE 4);

$C_4$ is the capacity per unit length between the homologous lateral portions of two non-adjacent bars (FIGURE 4); and $C_5$ is the capacity per unit length between the central portions of two adjacent bars (FIGURE 4).

This equation is derived along the lines of a general theory of periodic bar lines, developed by A. Leblond and G. Mourier in "Annales de Radioélectricité," April 1954, pages 180–192, and October 1954, pages 311–328. These authors introduce a definition of characteristic impedance $K(\psi)$ of a conductor forming part of a bar of a periodic delay line, this impedance varying with phase shift $\psi$ per cell of the line.

Now, the total length of a bar of the line considered in the present invention, which length is equal to $2L_1+2L_2+d$ according to FIGURE 3, may be decomposed into a succession of four conductors, having respective lengths:

$$L_1+\frac{d}{4},\ L_2+\frac{d}{4},\ L_2+\frac{d}{4}$$

The equation of the circuit is determined by the condition that impedances in each transition point between successive conductors be equal for respective conductors as viewed respectively from right to left and from left to right of such transition point.

Thus, the impedance in the transition point between conductors having respective lengths $$L_1+\frac{d}{4} \text{ and } L_2+\frac{d}{4}$$

is, for the conductor of length $$L_1+\frac{d}{4}$$

viewed from right to left:

$$K_1(\psi)\ \tan \frac{2\pi}{\lambda}\left(L_1+\frac{d}{4}\right)$$

and for the conductor of length $L_2+d/4$ viewed from left to right:

$$K_2(\psi)\ \cot \frac{2\pi}{\lambda}\left(L_2+\frac{d}{4}\right)$$

The equation of the circuit is thus:

$$K_1(\psi)\ \tan \frac{2\pi}{\lambda}\left(L_1+\frac{d}{4}\right)=K_2(\psi)\ \cot \frac{2\pi}{\lambda}\left(L_2+\frac{d}{4}\right)$$

or $$\tan \frac{2\pi}{\lambda}\left(L_1+\frac{d}{4}\right) \tan \frac{2\pi}{\lambda}\left(L_2+\frac{d}{4}\right)=\frac{K_2(\psi)}{K_1(\psi)} \qquad (1)$$

Now, according to Equation 9', page 314 of the aforementioned publication, and with the notations used in FIGURES 3 and 4 herein, we have:

$$\frac{1}{K_1(\psi)}=cC_2+4cC_3 \sin^2 \frac{\psi}{2}+4cC_4 \sin^2$$

and $$\frac{1}{K_2(\psi)}=cC_1+4cC_5 \sin^2 \frac{\psi}{2}$$

(where $c$ is the velocity of light) so that $$\frac{K_2(\psi)}{K_1(\psi)}=\frac{C_2+4C_3 \sin^2 \frac{\psi}{2}+4C_4 \sin^2 \psi}{C_1+4C_5 \sin^2 \frac{\psi}{2}} \qquad (2)$$

The above given formula results from 1 and 2.

Having determined from this formula $\psi$ as a function of $\lambda$, next will be determined the equation of the dispersion curve $$\frac{c}{v_{ph}}=f(\lambda)$$

wherein $c$=the speed of light and $v_{ph}$=the speed of the phase of the wave, by utilizing the following relation:

$$\frac{c}{v_{ph}}=\frac{\lambda}{4p}\times\frac{\psi}{\pi}$$

The displacement $d$ represents a parameter with a certain arbitrary measure. It is determined by a compromise between the desired band width, on the one hand, which increases, that is, the dispersion decreases, when the displacement increases, and the desired power, on the other, which diminishes with the increase in the displacement since the beam, which comes into interaction with the central portion of the ladder determined by the extent of overlap of successive bars, becomes more narrow at the central portion of the ladder determined by the extent current and less applied power. It has been possible, however, to determine a relative optimum which corresponds to the case in which the points of homologous extremities of three successive bars form an equilateral triangle, that is when:

$$d=p\sqrt{3}$$

as indicated in FIGURE 4.

As an illustrative example of the dimensions that may be used with the present invention, there may be indicated a line with bars of 75 millimeters unfolded or developed length, made of hollow tubes of 5 millimeter external diameter, with a pitch $p$=6 millimeters and a displacement of $d$=10 millimeters.

Figure 5:
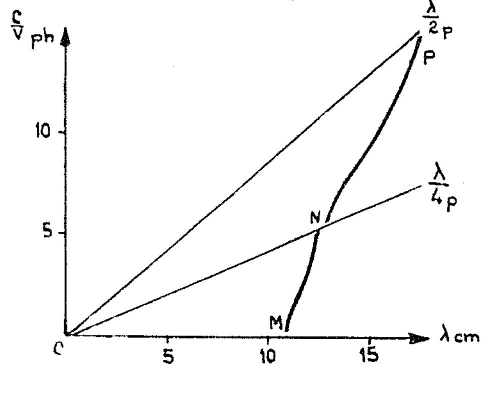
FIGURE 5 is a dispersion curve characteristic of delay lines in accordance with the present invention.

FIGURE 5 shows the dispersion curve of the symmetric mode calculated for this line according to the formula mentioned hereinabove and confirmed experimentally. This dispersion curve is composed of two branches with a small discontinuity. The first branch MN extends within the portion of the plane comprised between the axis of the abcissae and the straight line $$\frac{c}{v_{ph}}=\frac{\lambda}{4p}$$

This branch corresponds to the fundamental space component of the symmetric mode.

For higher wave lengths and larger delay ratios, there exists a second branch NP located within the portion of the plane comprised between the straight line $$\frac{c}{v_{ph}}=\frac{\lambda}{4p}$$

and the straight line $$\frac{c}{v_{ph}}=\frac{\lambda}{2p}$$

This second branch corresponds to the first space harmonic of the symmetric mode. The upwardly slanting configuration over the entire extent of the curve indicates that the line presents a backward dispersion for the symmetric mode. Consequently, delay lines according to the present invention are utilizeable advantageously within the tubes utilizing the interaction with the backward wave, in particular within backward wave oscillators such as "Carcinotrons."

The particular line described hereinabove has been effectively used in a backward wave oscillator within the band of 15 centimeters and has permitted a realization of a band-width of 25%.

It may be readily seen that this result has been attained with a delay line of simple construction, comprising in particular a smooth back plate and without any lateral support of either ridged or slotted nature.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A ladder type delay line for microwave tubes having the characteristic of backward propagation for both the fundamental component as well as for the first space harmonic of the symmetric mode, comprising a series of periodically spaced bars, said bars being of identical dimensions and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent substantially perpendicular to the plane of said series, and a substantially smooth back plate extending substantially parallel to said bars, said extremities being fixed to said back plate.

2. A ladder type delay line for microwave tubes, comprising a series of periodically spaced bars, said bars being of identical dimensions and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudial plane of antisymmetry for said line, the extremities of said bars being bent substantially perpendicular to the plane of said series, and a substantially smooth back plate extending substantially parallel to said bars, said extremities being fixed to said back plate, the ratio between the length of said shaft between adjacent bars and the spacing between said bars being substantially equal to $\sqrt{3}$.

3. A ladder type delay line for microwave tubes, having the characteristic of backward propagation for both the fundamental component as well as for the first space harmonic of the symmetric mode, comprising a series of periodically spaced bars, said bars being of identical dimensions and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent substantially perpendicular to the plane of said series, and a substantially smooth back plate extending substantially parallel to said bars, said extremities being fixed to said plate, the length of each bar between the extremities thereof fixed to said back plate being substantially equal to a half wavelength of approximately the middle wave of the band to be propagated through said line.

4. A ladder type delay line for microwave tubes having the characteristic of backward propagation for both the fundamental component as well as for the first space harmonic of the symmetric mode, comprising a series of periodically spaced bars made of metallic hollow tubes, said bars being of identical dimensions and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent substantially perpendicular to the plane of said series, and a substantially smooth back plate extending substantially parallel to said bars, said extremities being fixed to said back plate.

5. A ladder type delay line for microwave tubes, having the characteristic of backward propagation for both the fundamental component as well as for the first space harmonic of the symmetric mode, comprising a series of periodically spaced bars made of metallic hollow tubes, said bars being of identical dimensions and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent substantially perpendicular to the plane of said series, and a substantially smooth back plate extending substantially parallel to said bars, said extremities traversing said back plate and being fixed to said back plate, an inlet and outlet being provided leading to the interior of the tube to enable circulation therethrough of a cooling medium.

6. A ladder type delay line for microwave tubes having the characteristic of backward propagation for both the fundamental component as well as for the first space harmonic of the symmetric mode, comprising a series of spaced bars, and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent, and a substantially smooth back plate, said extremities being fixed to said back plate.

7. A ladder type delay line for microwave tubes, comprising a series of periodically spaced bars, said bars being of identical dimensions and successive adjacent bars being alternately displaced in opposite lateral directions by substantially equal amounts from a plane which bisects the total width of the resultant structure, thereby forming a longitudinal plane of antisymmetry for said line, the extremities of said bars being bent substantially perpendicular to the plane of said series, and a substantially smooth back plate extending substantially parallel to said bars, said extremities being fixed to said back plate, the ratio between the length of said shift between adjacent bars and the spacing between said bars being substantially equal to $\sqrt{3}$, the length of each bar between the extremities thereof fixed to said back plate being substantially equal to a half wavelength of approximately the middle wave of the band to be propagated through said line.

8. A ladder type delay line for microwave tubes, comprising a series of spaced bars, and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent and a substantially smooth back plate, said extremities being fixed to said back plate, the ratio between the length of said shift between adjacent bars and the spacing between said bars being substantially equal to $\sqrt{3}$.

9. A ladder type delay line for microwave tubes, comprising a series of periodically spaced bars made of metallic hollow tubes, said bars being of identical dimensions and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent substantially perpendicular to the plane of said series, and a substantially smooth back plate extending substantially parallel to said bars, said extremities traversing said back plate and being fixed to said back plate, an inlet and outlet being provided leading to the interior of the tube to enable circulation therethrough of a cooling medium, the ratio between the length of said shift between adjacent bars and the spacing between said bars being substantially equal to $\sqrt{3}$, the length of each bar between the extremities thereof fixed to said back plate being substantially equal to a half wavelength of approximately the middle wave of the band to be propagated through said line.

10. A ladder type delay line for microwave tubes having the characteristic of backward propagation for both the fundamental component as well as for the first space harmonic of the symmetric mode, comprising a series of spaced bars, and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, the extremities of said bars being bent, and a substantially smooth back plate, said extremities being fixed to said back plate, the length of each bar between the extremities thereof fixed to said back plate being substantially equal to a half wavelength of approximately the middle wave of the band to be propagated through said line.

11. A ladder type delay line for microwave tubes, comprising a series of periodically spaced bars, and means for imparting to said delay line a backward dispersion for the symmetric mode of the fundamental space component and of the first space harmonic including successive adjacent bars alternately displaced in opposite lateral directions by substantially equal amounts from a plane which bisects the total width of the resultant structure, thereby forming a longitudinal plane of antisymmetry for said line, and a back plate for said line, the extremities of said bars being bent toward said back plate and being fixed thereto, and the bent ends on the same side of a cell of said delay line forming approximately the corners of an equilateral triangle.

References Cited by the Examiner

UNITED STATES PATENTS

| | | | |
|---|---|---|---|
| 2,827,588 | 3/1958 | Guenard et al. | 333—31 |
| 2,888,598 | 5/1958 | Palluel | 333—31 |
| 2,857,548 | 10/1958 | Kompfner | 333—31 |
| 2,890,384 | 6/1959 | Dench | 333—31 |
| 2,920,227 | 1/1960 | Dobler | 333—31 |
| 2,922,918 | 1/1960 | Wasserman | 333—31 |

HERMAN KARL SAALBACH, *Primary Examiner.*

ELI LIEBERMAN, *Examiner.*